United States Patent [19]
Farber et al.

[11] 3,873,573

[45] Mar. 25, 1975

[54] PHTHALIDE COMPOUNDS

[75] Inventors: Sheldon Farber, Appleton, Wis.; Troy E. Hoover, Kettering, Ohio; David B. McQuain; Arthur J. Wright, both of Dayton, Ohio

[73] Assignee: NCR Corporation, Dayton, Ohio

[22] Filed: June 29, 1973

[21] Appl. No.: 374,838

Related U.S. Application Data

[62] Division of Ser. No. 176,296, Aug. 30, 1971, abandoned.

[52] U.S. Cl............... 260/343.4, 260/335, 260/517, 260/571, 260/574, 260/575
[51] Int. Cl............................................. C07d 5/06
[58] Field of Search....................... 260/343.3, 343.4

[56] References Cited
UNITED STATES PATENTS
499,927   6/1893   Monnet............................ 260/343.4

OTHER PUBLICATIONS
Chemical Abstracts, Vol. 73, 1970, 55953a.

*Primary Examiner*—Donald G. Daus
*Assistant Examiner*—Anne Marie T. Tighe
*Attorney, Agent, or Firm*—Robert J. Shafer; E. Frank McKinney

[57]        ABSTRACT

Processes for the synthesis of phthalides and fluorans are disclosed. New isolatable intermediate phthalides have been found which serve as precursors to the production of fluorans. The products of this invention are synthesized from keto acids and phenolic amines, wherein the mole ratio of the keto acids to the phenolic amines is in excess of 1:1. Not only is product yield greatly improved, but usual condensation times of 24 hours and longer have been reduced to about 5 hours.

2 Claims, No Drawings

PHTHALIDE COMPOUNDS

This is a division of Ser. No. 176,296 filed Aug. 30, 1971, now abandoned.

This invention relates to the synthesis of phthalides and to the synthesis of fluorans. In another aspect, this invention relates to the synthesized phthalides.

Various processes for the preparation of fluorans are known in the art. General synthesis methods comprise a reaction between a keto acid and a phenolic amine in concentrated sulfuric acid. Reaction times for these general synthesis methods range from 6 to 48 hours. Often, in these general synthesis methods, the concentrated sulfuric acid reacts with the phenolic starting material to produce a sulfonated phenolic amine. Naturally, this side reaction decreases the probability of the phenolic amine reacting with the keto acid to produce the desired fluoran.

It now has been discovered that phthalides can be synthesized from keto acids and phenolic amines by carrying out the reaction in concentrated sulfuric acid at about room temperature, wherein the mole ratio of keto acid to phenolic amine is in excess of 1:1. The second step of this synthesis involves continuing the reaction at room temperature, but at a pH of 9.5 to 10.0. The solid phthalide is isolated by water dilution and filtration.

The recovered phthalide is converted to a fluoran by heating at a temperature of about 90° centigrade at a pH of 10.5 to 11.0. Isolation of the fluoran is similar to isolation of the phthalide.

It also has been discovered that fluorans can be synthesized from keto acids and phenolic amines by carrying out the reaction in concentrated sulfuric acid at room temperature, wherein the mole ratio of keto acid to phenolic amine is in excess of 1:1. The second step of this synthesis involves continuing the reaction at a temperature of about 90° C. and at a pH of 10.5 to 11.0. The solid fluoran is isolated by water dilution and filtration.

New isolatable phthalides also have been found. These phthalides can serve as precursors in the production of fluorans.

Accordingly, an object of this invention is to provide processes for the synthesis of phthalides.

Another object of this invention is to provide processes for the synthesis of fluorans.

Still another object of this invention is to provide phthalides.

Other objects, aspects and advantages of this invention will be apparent to one skilled in the art from the following specification and appended claims.

The keto acids employed in this invention are represented by the formula:

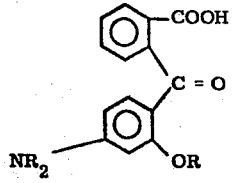

wherein each R is hydrogen or an alkyl radical having 1 to 4 carbon atoms.

Specific examples of keto acids that can be employed in this invention are: 2'-carboxy-4-diethylamino-2-hydroxy-benzophenone; 2'-carboxy-4-diethylamino-2-methoxy-benzophenone; 2'-carboxy-4-dimethylamino-2-hydroxy-benzophenone; 2'-carboxy-4-dimethylamino-2-ethoxybenzophenone, and the like.

The phenolic amines employed in this invention are represented by the formula:

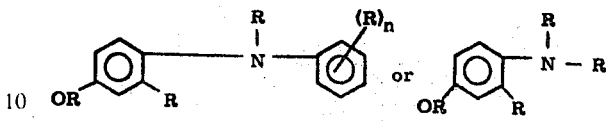

wherein R is as previously defined and $n$ is zero or an integer from 1 to 5.

Specific examples of the phenolic amines that can be employed in this invention are: p-anilinophenol; 3-methyl-4-anilinophenol; p-(N-methyl-p-toluidino)phenol; p-(p-toluidino)phenol; p-(N-methylanilino)phenol; 3-methyl-4-(p-toluidino)phenol; 4-methoxy-2-methyl-diphenylamine, and the like.

The phthalides and fluorans produced by the process of this invention are represented by the following formulas respectively:

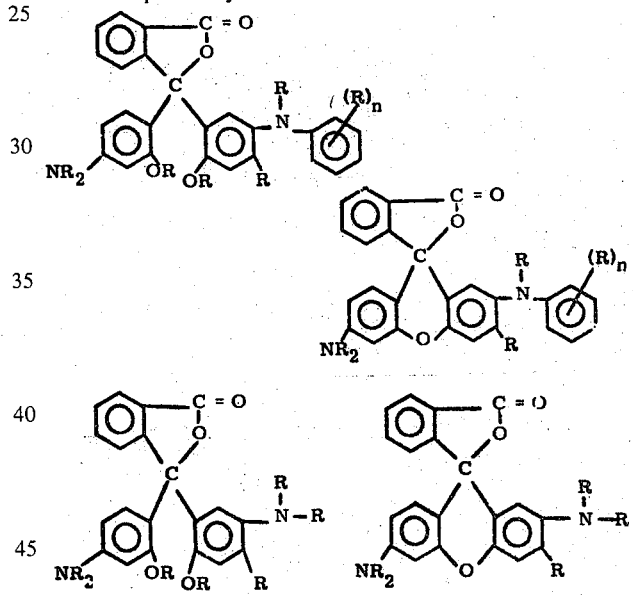

wherein R and $n$ are as previously defined.

In the reaction between the keto acid and the phenolic amine in concentrated sulfuric acid, the temperature generally ranges from 10° to 30° C. Preferably, the concentration of the sulfuric acid is 96 to 97 percent and the temperature is 20° to 25° C. This reaction is carried out for a time ranging from 2 to 5 hours, preferably 3 to 4.5 hours. The second step of this invention continues at the same temperatures, but at a pH ranging from 9.0 to 10.5, preferably 9.5 to 10.0. The reaction time for the second step ranges from 1 to 3 hours and preferably is about 2 hours.

The solid phthalide is isolated by water dilution and filtration. The solid is generally washed with small portions of water followed by a small hexane wash. The phthalide then can be dried by air or heat.

If desired, the isolated phthalide is converted to a fluoran by heating at a temperature of 80° to 100° C., at a pH of 10.0 to 11.5 and for a time ranging from 3 to 5 hours. Preferably, the temperature is about 90° C., the pH ranges from 10.5 to 11.0 and the time is 4 hours.

Isolation of the fluoran is similar to the previously described isolation of the phthalide. The isolated phthalide also can be converted to a fluoran by heating or by contacting with alumina or silica. Specific examples of phthalides that have been produced by the process of this invention are 3,3-(4-diethylamino-2-hydroxy phenyl) (5-anilino-2-methoxy-4-methyl phenyl)phthalide; 3,3-(4-diethylamino-2-hydroxy phenyl) (5-amino-2,4-dimethylphenyl)phthalide; and 3,3-(4-diethylamino-2-hydroxy phenyl) (5-amino-2-hexoxyphenyl)phthalide.

When it is desired to synthesize the fluoran without the isolation of the phthalide, the second step of the synthesis is carried out at a temperature of 80° to 100° C., at a pH of 10.0 to 11.5 and for a time ranging from 3 to 5 hours. Preferably, the temperature is about 90° C., the pH ranges from 10.5 to 11.0 and the time is 4 hours. Isolation of the fluoran is similar to the previously described methods of isolation.

The pH adjustments of this invention are preferably carried out by the addition of sodium hydroxide in a 25 percent aqueous solution.

The processes of this invention are carried out under a pressure which can vary widely. Preferably, this pressure is atmospheric pressure.

The mole ratio of keto acid to phenolic amine is in excess of 1:1. Generally, this mole ratio ranges from 1.1:1 to 2:1. Preferably, this ratio is 1.3:1.

The mole ratio of sulfuric acid to keto acid varies widely. Preferably, this ratio is 18:1.

In a preferred embodiment, the keto acid is predissolved in the sulfuric acid. If desired, the predissolved mixture of keto acid and sulfuric acid can be preheated up to a temperature of 50° C. The phenolic amine is added to the reaction mixture slowly over a period of time. In large scale runs, the predissolving technique is especially useful for the control of the exothermic heat which is generated during the reactions.

Dilution by water where employed, precipitates the solid product so that it can be easily isolated.

The phthalides are useful in themselves in that they are colored dyes. For example, 3,3-(4-diethylamino-2-hydroxy phenyl) (5-anilino-2-methoxy-4-methyl phenyl)phthalide exhibits a yellow color in a strong base.

By raising the mole ratio of keto acid to phenolic amine above 1:1, the phthalide and fluoran yield is greatly improved. New isolatable intermediate phthalides have been found which serve as precursors to the production of fluorans. Usual condensation times of 24 hours and longer have been reduced to about 5 hours. By presenting as high a concentration of keto acid as possible to the phenolic amine, the probability of reacting the amine with the acid is increased, while the probability of sulfonating the amine is decreased.

The advantages of this invention are further illustrated by the following examples. The reactants, proportions and other specific conditions are presented as being typical and should not be construed to limit the invention unduly.

EXAMPLE I

At 40°–45° C., 3.44 g. (0.011 mole) of 2'-carboxy-4-diethylamino-2-hydroxy-benzophenone (hereinafter referred to as K.A.) was dissolved in 8.0 ml. (0.147 mole) of concentrated sulfuric acid. The solution was cooled to 20° C. Over a period of 70 minutes, the following alternate additions of 4-methoxy-2-methyl-diphenylamine (hereinafter referred to as P.A.) (0.0095 mole) and additional K.A. (0.002 mole) were made:

| Time | P.A. | K.A. |
| --- | --- | --- |
| 0–20 minutes | 1.03 g. | 0 |
| 20–25 minutes | 0 | 0.31 g. |
| 25–45 minutes | 0.60 g. | 0 |
| 45–50 minutes | 0 | 0.31 g. |
| 50–70 minutes | 0.40 g. | 0 |

After reacting for an additional 2.5 hours at 20°–25° C., the very viscous reaction solution was poured into a well stirred mixture of 35 g. of ice and 25 ml. of water. To the slurry of the light pink precipitate was added 50 ml. of 25% NaOH (0.3 mole) and 30 ml. of acetone. The pH was then adjusted to and maintained in the rate of 10.5 to 11.0. The reaction continued and the temperature was raised to 90° C. over a 1.5 hour period.

When essentially all of the acetone was removed, the reaction mixture was cooled to room temperature and filtered. The solid was washed with 25° C. water (until the filtrate was no longer pink colored) and then with 15 ml. of 60° C. water and 10 ml. of hexane.

The 2'-anilino-6'-diethylamino-3'-methylfluoran solid was air and oven (1 hour at 100° C.) dried. The yield was 3.87 g. (85 wt. %) and had a melting point of 186°–188° C.

From the combined aqueous filtrates, 94 wt. % of the unused K.A. was recovered.

Not only was the yield of the desired fluoran derivative very high, but the total reaction time was only 5 hours and 10 minutes. Further, substantially all of the unreacted K.A. was recovered.

EXAMPLE II

2'-carboxy-4-diethylamino-2-hydroxy-benzophenone (K.A.) and 4-methoxy-2-methyl-diphenylamine (P.A.) were reacted a second time under the following conditions.

To 17 ml. of concentrated sulfuric acid maintained at 10°–12° C. was added portionwise 3.13 g. (0.01) mole of K.A. To avoid formation of slowly dissolving lumps, the addition was made over a 30-minute period. At the above temperature and with continued stirring, 2.13 g. (0.01 mole) of P.A. was added over a 1.5 hour period. The P.A. was divided into portions containing 50% of the total, 30% of the total, and 20% of the total. Each portion was added over a 0.5 hour period.

After an additional 3 hours stirring at 10°–12° C., the reaction solution was poured into a well-stirred mixture of 30 g. of ice and 50 ml. of water. A nearly white precipitate resulted. While the temperature was maintained below 15° C., the pH was raised to a fairly constant value of 8.0 (using 97 ml. of 25% NaOH solution). The product was isolated by filtration and washed with 1 × 50 and 3 × 25 ml. portions of cold water. A 5.53 g. residue (theory for the precursor — 5.08 g.), m.p. 150°–160° C. remained after 1.5 hours drying at 70° C. under reduced pressure.

The solid precursor or 3,3-(4-diethylamino-2-hydroxy phenyl) (5-anilino-2-methoxy-4-methyl phenyl)phthalide was re-slurried and re-washed. The final yield was essentially 100% of theory.

EXAMPLE III

A well stirred slurry of 2.03 g. of precursor (from Example II) in 70 ml. of water was brought to pH 10.5–11.0. The mixture was maintained at 80°–85° C. The initial reddish-purple of the solid gradually changes to a light tan color. After 4.5 hours no precursor spot (on alumina) could be detected. An additional 0.5 hour of heating was employed and the mixture cooled to 20° C.

The solid was isolated by filtration. While on the filter, it was slurried and washed with 2 × 10 ml. of water and finally 5 ml. of hexane. After drying 1.5 hours at 100° C., the weight of the product (m.p. 188°–189.5° C.) was 1.435 g. (75.7% conversion of the precursor).

Examples II and III demonstrate the isolation of the phthalide derivative and its subsequent conversion to the fluoran derivative, e.g., 2′-anilino-6′-diethylamino-3′-methylfluoran, with a high yield. Reaction times in each Example were approximately 5 hours. Thus, the phthalide derivative can be isolated, if desired, and converted to the fluoran derivative at a later date and still maintain reduced reaction time.

EXAMPLE IV

A run was carried out with the same reactants as employed in Example I, except that mole ratio of K.A. to P.A. was 1:1.

In 30 ml. of concentrated sulfuric acid at 45° C. was dissolved 6.27 g. (0.02 mole) of K.A. At 20° C. over a 2.5 hour period was added 4.27 g. (0.02 mole) of P.A. After a total of 8 hours at 20° C. the reaction solution was poured into a water-ice mixture. The solid was removed by filtration and treated with 95 ml. of 25% NaOH solution for 30 minutes at room temperature.

After washing with water and 50 ml. of 10% benzene in hexane, 8.15 g. of solid, m.p. 187.5°–189.0° C. was obtained. The initial acidic aqueous filtrate from above was treated likewise to give an additional 0.60 g., m.p. the same. Assay of the product showed that it was 52% of the fluoran derivative.

The 2′-anilino-6′-diethylamino-3′-methylfluoran yield of this run was substantially less than the yield obtained in Examples I and III where an excess of K.A. over P.A. were employed.

EXAMPLE V

A run was carried out to obtain a constant melting material of the 3,3-(4-diethylamino-2-hydroxy phenyl) (5-anilino-2-methoxy-4-methyl phenyl) phthalide precursor.

To a mixture of 4-diethylamino-2-hydroxy 2′-carboxy benzophenone (0.05 moles) and 74 ml. of concentrated sulfuric acid was added 16.1 g. of 4-methoxy-2-methyl-diphenylamine (0.075 moles) while keeping the temperature at 0°–10° C. by means of an ice bath. The reaction mixture was allowed to warm up to room temperature and stirred 72 hours. The reaction mixture was poured into 700 g. of ice and 300 ml. of water and made basic by addition of 170 ml. of 50% sodium hydroxide solution. The aqueous was extracted with 600 ml. of benzene, then 250 ml. of benzene. The combined benzene extracts were washed with 200 ml. of 10% sodium hydroxide and six 250 ml. portions of water. The benzene was dried ($Na_2SO_4$) and concentrated. Recrystallization of the residue afforded 14.2 g. (53%) of material. Repeated recrystallization from benzene or toluene afforded constant melting material of 200.0°–200.5° C.

Although this invention has been described in considerable detail, it must be understood that such detail is for the purpose of illustration only and that many variations and modifications can be made by one skilled in the art without departing from the scope and spirit thereof.

What is claimed is:

1. A phthalide represented by the formula:

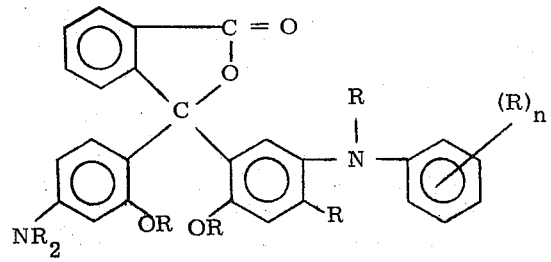

wherein each R is hydrogen or an alkyl radical having 1 to 4 carbon atoms and $n$ is o or 1.

2. A phthalide according to claim 1 wherein the phthalide is 3,3-(4-diethylamino-2-hydroxyphenyl) (5-anilino-2-methoxy-4-methylphenyl)phthalide.

* * * * *